United States Patent [19]

Lively

[11] Patent Number: 4,817,217
[45] Date of Patent: Apr. 4, 1989

[54] SWIMMING POOL CONTROL SYSTEM

[76] Inventor: Olin A. Lively, 4375 Shady Bend, Dallas, Tex. 75234

[21] Appl. No.: 53,860

[22] Filed: May 26, 1987

Related U.S. Application Data

[63] Continuation of Ser. No. 703,272, Feb. 20, 1985, Pat. No. 4,685,158.

[51] Int. Cl.⁴ .......................... E04H 3/16; E04H 3/18
[52] U.S. Cl. ........................................ 4/508; 210/138
[58] Field of Search .................... 4/508, 496; 210/104, 210/138, 169; 137/393, 392, 391, 386, 403; 73/308

[56] References Cited

U.S. PATENT DOCUMENTS

| | | | |
|---|---|---|---|
| 4,380,091 | 4/1983 | Lively | 4/508 |
| 4,445,238 | 5/1984 | Maxhimer | 4/508 |
| 4,612,949 | 9/1986 | Henson | 4/508 |

Primary Examiner—Henry J. Recla
Assistant Examiner—Edward Donovan
Attorney, Agent, or Firm—Lockwood, Alex, Fitzgibbon & Cummings

[57] ABSTRACT

A control system for automatically maintaining a predetermined water level in a swimming pool includes a multi-contact water level sensor unit mounted on an exposed sidewall of the pool. The sensor unit is vertically adjustable within a stationary mounting bracket to enable user adjustment of a selected normal water level. A single sensing contact on the sensor unit senses the presence or absence of water at the selected normal level. A monitoring circuit associated with the sensor unit interrupts operation of the control system in the event that the sensor unit is disconnected. Additional water level sensing contacts open a dump valve to preclude overflow of the pool in the event of a high water condition, and interrupt operation of recirculation pump apparatus associated with the pool in the event of a low water level.

7 Claims, 3 Drawing Sheets

SWIMMING POOL CONTROL SYSTEM

This application is a continuation of application Ser. No. 703,272, filed Feb. 20, 1985, now U.S. Pat. No. 4,685,158.

BACKGROUND OF THE INVENTION

Th present invention relates generally to swimming pool control systems, and more particularly to an improved water level control system which automatically maintains a selected water level and which provides protection against high water and low water conditions and system malfunction.

To compensate for increases or decreases in water level, such as might occur over varying periods of time as a result of precipitation or evaporation, swimming pools often are provided with an automatic water level control system. In addition to controlling a fill valve to admit water to the pool, and a dump valve to withdraw water from the pool, such control systems may also control ancillary pool system components, such as filter and cleaner recirculation pumps.

One water level control system which has proven particularly attractive because of its use of a surface-mounted sensor unit is described in U.S. Pat. No. 4,380,091 of the present inventor. The present invention constitutes an improvement in this system in that it utilizes a simplified sensor unit for sensing water levels, precludes operation of recirculation pumps at low water levels, prevents operation in the event the sensor unit is disconnected and provides for convenient user-adjustment of water level.

It is therefore a principal object of the present invention to provide a new and improved swimming pool control system.

It is a more specific object of the present invention to provide a swimming pool control system having means whereby the water level of the pool can be readily adjusted by the user.

It is another more specific object of the invention to provide a swimming pool control system wherein the system is rendered inoperative in the event the sensor unit is disconnected.

It is another more specific object of the present invention to provide a swimming pool control system which utilizes a water level sensor of improved construction.

It is another more specific object of the present to provide a swimming pool control system wherein operation of the recirculation pump is precluded in the event of low water level.

SUMMARY OF THE INVENTION

The invention is directed to a system for controlling the level of water in a swimming pool of the type having a fill valve and a dump valve. The system comprises water level sensing means positioned in the pool for producing an output signal indicative after a first predetermined delay period of the presence of water during the first delay period, and after a second predetermined delay period, of the absence of water during the second delay period, at a predetermined normal water level within the pool, and control circuit means for opening the fill valve in response to the output signal indicating the absence of water at the normal level, and for closing the fill valve in response to the output signal indicating the presence of water at the normal level, to maintain the water in the pool at the predetermined level.

The invention is further directed to a control system for controlling the level of water in a swimming pool of the type having a fill valve and a dump valve. The system comprises first water level sensing means positioned in the pool for producing a first output signal indicative after a first predetermined delay period of the presence of water during the first delay period, and after a second predetermined delay period, of the absence of water during the second delay period, at a predetermined normal water level within the pool, and second water level sensing means in the pool for producing a second output signal indicative after a third predetermined delay period of the presence of water during the third delay period, and after a fourth predetermined delay period, of the absence of water during the fourth delay period, at a predetermined maximum water level in the pool. Control circuit means are provided for opening the fill valve in response to the first output signal indicating the absence of water at the normal level, and for closing the fill valve in response to the output signal indicating the presence of water at the normal level, and for opening the dump valve in response to the second output signal indicating the presence of water at the maximum level, and for closing the dump valve in response to the second output signal indicating the absence of water at the maximum level, to maintain the water in the pool at the normal level.

The invention is further directed to a system for controlling the level of water in a swimming pool which is adapted to control a fill valve to add water to the pool as required. The system comprises water level sensing means positioned at a predetermined location in the pool, control circuit means interconnected with the sensing means and responsive to the presence or absence of water at the predetermined location for controlling the addition of water to the pool, and monitor circuit means responsive to the interconnection between the water level sensing means and the control circuit means for inhibiting operation of the fill valve upon the interconnection being interrupted.

The invention is further directed to a system for controlling the level of water in a swimming pool wherein the system is adapted to control a fill valve to add water as required. The system comprises water level sensing means positioned at a predetermined location in the pool, and control circuit means interconnected with the sensing means and responsive to the presence or absence of water at the predetermined location for controlling the addition of water to the pool. The water level sensing means comprise a sensor unit which is mounted on an exposed sidewall of the pool and is slidably adjustable relative to the bottom of the pool to facilitate user-adjustment of water levels maintained by the system.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
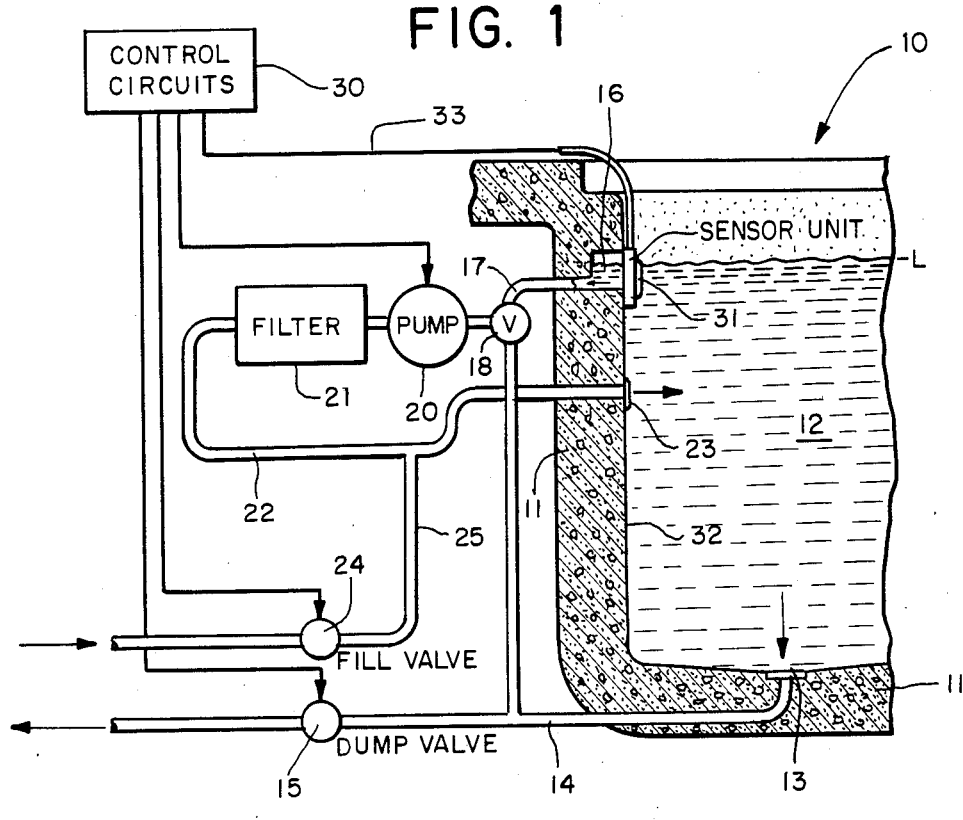
FIG. 1 is a sectional view of a typical swimming pool system, taken in elevation, illustrating an arrangement of fill and dump conduits and a water recirculation system and schematically illustrating the principal components of the water level control system of the invention.

Referring to the Figures, and to FIG. 1 in particular, there is shown a swimming pool system, generally designated 10, of conventional construction having a sidewall 11 formed of concrete or other suitable material. A volume of water 12 fills the pool to a normal operating level L.

In accordance with conventional practice, water is removed from the pool through a drain 13 and a connecting drain conduit 14. A dump valve 15 connects drain conduit 14 to a sewer or the like to facilitate dumping water from the pool. Water is also removed from the pool by means of a skimmer outlet 16 located about the periphery of the pool at the normal water level L. Water drained by skimmer outlet 16 is conveyed by a connecting conduit 17 to a valve 18, where it is combined in a predetermined proportion with water removed from the pool through drain 13 and conduit 14. The combined drain water is conveyed by a circulation pump 20 through a filter 21 and conduit 22 back into the pool through a water inlet 23 located in the sidewall 11 of the pool below the nominal water level L. When necessary to add water to the pool water is admitted through inlet 23 through a fill valve 24 and connecting conduit 25.

It will be appreciated that in practice multiple drains and inlets may be provided at various locations within the pool. Also, various auxiliary components such as heaters and chlorine additive devices may be provided to condition the pool water, and that these are not shown in this application to avoid unnecessary complexity.

To provide for automatic functioning of recirculation pump 20, dump valve 15 and fill valve 24, the swimming pool system 10 includes an electronic control system 30 comprising contrtol circuits mounted at a remote location, and a sensor unit 31 mounted on a vertical sidewall surface 32 of sidewall 11 so as to sense water level within the pool. Sensor 31 is connected by a multi-conductor cable 33 to control circuits 30 whereby the control circuits are rendered responsive to the water level as sensed by the sensor unit.

Figure 2:
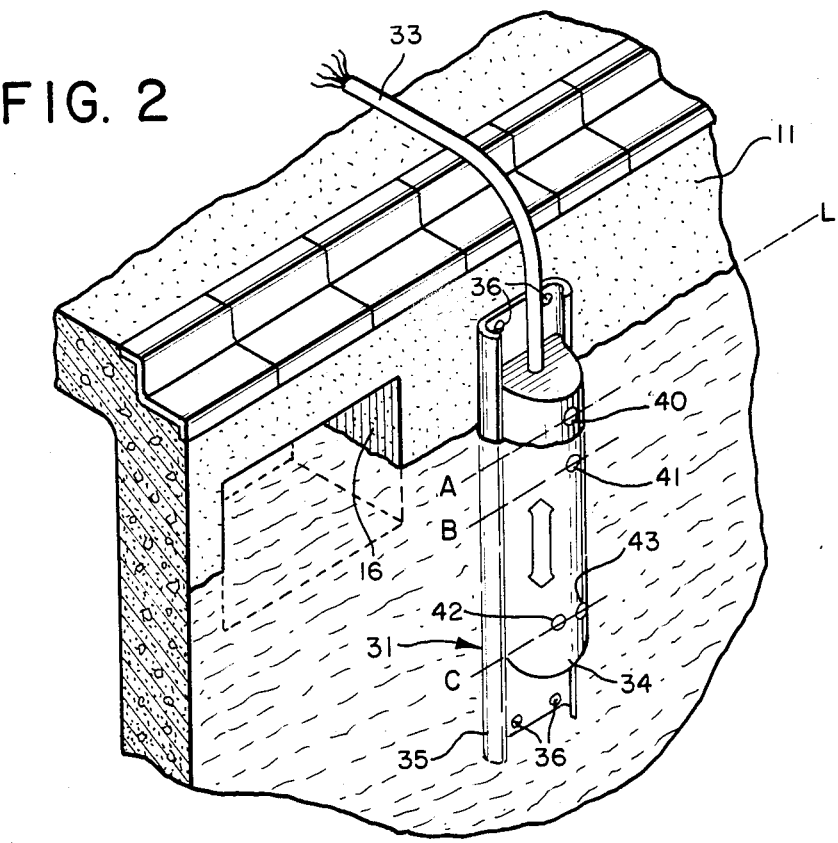
FIG. 2 is a perspective view of the sensor unit of the pool control system illustrating the unit installed on a sidewall of the pool.

Referring to FIG. 2, sensor unit 31 is seen to comprise an elongated housing 34 slidably received with a tray-like mounting bracket 35. The mounting bracket 35 is secured to the surface 32 of sidewall 11 by a plurality of fasteners 36 anchored into the underlying surface of the sidewall, or by other appropriate means. The sensor housing 34 is slidable within mounting bracket 35 so that, in accordance with one aspect of the invention, its position relative to the pool bottom, and hence the water level maintained in the pool, is adjustable by the pool operator. The sensor housing is preferably rounded at its submerged end and free of sharp edges, and may be advantageously formed of a molded fiberglass or plastic material. Cable 33 extends from the non-submerged end of the housing and preferably includes a durable jacket formed of waterproof and weather-resistant material.

To provide for sensing water levels, the exterior surface of sensor unit housing 34 includes four exposed contact surfaces 40-43. In normal operation, with sensor unit 31 appropriately positioned, contact 40 is located above the normal water level L, at a level A. Contact 41 at this time is located below the normal level L at a level B. Contacts 42 and 43 are located side-by-side below water level L and level B at a level C. As will be seen presently, this arrangement of contacts 40-43 enables water to be maintained at the normal level L, while providing protection against high and low water levels.

Figure 3:
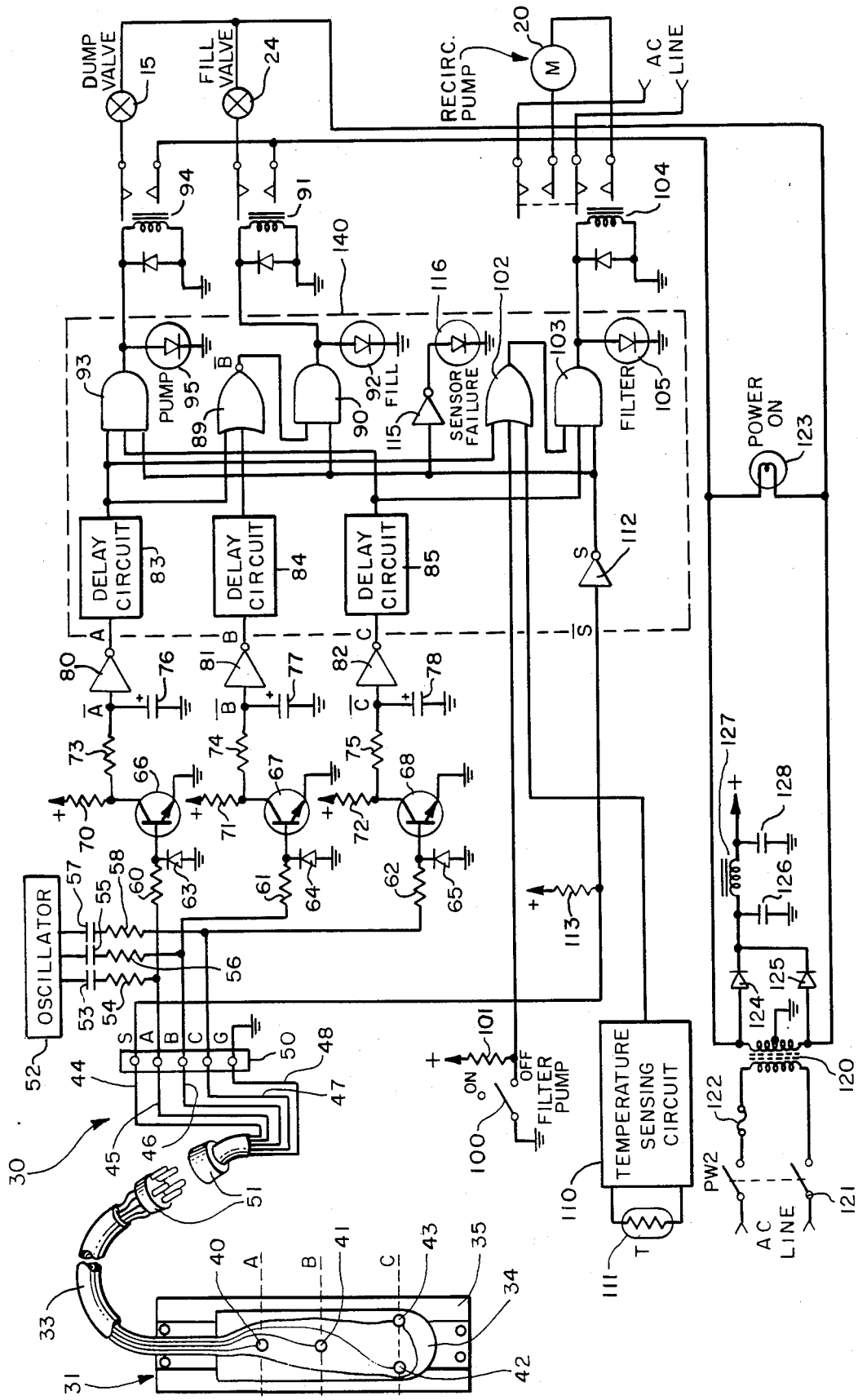
FIG. 3 is a simplified electrical schematic diagram of the swimming pool control system of the invention.

Referring to FIG. 3, sensor unit 31 is seen to be connected to control circuits 30 by five conductors 44-48 within cable 33. Within the control circuits conductors 44-48 are terminated at respective terminals of a five terminal connector block 50. An in-line connector 51 may be provided if required to enable the sensor unit 31 to be removed for storage during periods of pool system shut-down, such as during off-seasons or during repairs.

To provide for sensing the presence or absence of water at contacts 40-42, and hence at levels A-C, respectively, an alternating current signal is applied to conductors 45-47 by an oscillator circuit 52 through individual capacitor-resistor coupling networks. Specifically, an alternating current is applied to conductor 45 through a capacitor 53 and resistor 54, to conductor 46 by a capacitor 55 and resistor 56, and to conductor 47 through a capacitor 57 and resistor 58. In the presence of water at a water sensing contact level the alternating current applied to that contact is shunted to ground so that only a very small residual signal remains on the associated conductor. However, in the absence of water a relatively high impedance to ground exists at the contact, and a relatively high alternating current exists on the associated conductor.

To sense the presence or absence of alternating current on conductors 45-47, and hence the presence or absence of water at sensing levels A, B and C, the three conductors 45-47 are coupled by respective ones of series-connected resistors 60-62 and diodes 63-65 to respective ones of NPN transistors 66-68. The emitter of each transistor is connected to ground. The collector of each transistor is connected through respective ones of connector load resistors 70-72 to a source of positive unidirectional current, and through respective ones of resistors 73-75 and capacitors 76-78 to respective ones of inverter amplifiers 80-82.

In operation, resistor 60 and diode 63 together rectify alternating current on conductor 45, if present, to develop a DC control current at the base-emitter junction of transistor 66. This control current biases the transistor into conduction, causing a voltage drop at the collector of the transistor which appears at the input of inverter amplifier 80. Resistor 73 and capacitor 76 together provide an RC time consatat which attenuates minor disturbances at the output of transistor 66, such as might result from intermittent splashing or wave action at contact 40, as described in previously identified U.S. Pat. No. 4,380,091.

Similarly, resistor 61 and diode 64 together constitute an input circuit for transistor 67, and resistor 74 and capacitor 77 apply the output signal from that transistor to inverter amplifier 81. Resistors 62 and diode 65 together comprise an input circuit for transistor 72, and resistor 75 and capacitor 78 together comprise an output circuit which applies the output signal developed by the transistor to inverter amplifier 82.

The effect of inverter amplifiers 80–82 is to invert the output signals of transistors 66–68, thereby providing individual output signals which are positive, or logic high, in the presence of water at contacts 40–42, respectively. This is, the output of inverter amplifier 80 is logic high in the presence of water at level A and logic low in the absence of water, the output of inverter amplifier 81 is logic high in the presence of water at level B and logic low in the absence of water, and the output of inverter amplifier 82 is logic high in the presence of water at level C and logic low in the absence of water.

The fourth sensing contact 43 of sensor unit 31 is connected by conductor 48 to terminal strip 50, wherein it is connected to ground. Contact 43 is also connected by conductor 44 to terminal strip 50 wherein it is utilized in conjunction with a monitoring circuit to prevent operation of the control system in the event sensor unit 31 is disconnected.

To provide for recognition only of steady-state water conditions, the outputs of inverter amplifiers 80–82 are connected to respective ones of three delay circuits 83–85. These circuits function to provide a change in output only after a change in input has existed for a predetermined period of time. That is, no change in output is produced until an input has existed for a predetermined period of time, and once the output has changed, it does not change back until the input has changed back for a predetermined period of time. Various time periods may be established for the three delay circuits, and different delay periods may be provided for indicating the presence and absence of water by a particular delay circuit. Although the length of delay may be optimized to suit particular pool systems and usage patterns, it has been found in practice that a set delay period of two minutes for indicating the presence and absence of water by all three delay circuits provides good results in home pool installations.

To maintain water at the normal water level L, the control system of the invention provides, in accordance with another aspect of the invention, that the output of delay circuit 84 is connected through a NOR gate 89 and an AND gate 90 to a fill valve control relay 91. In the absence of a logic high output from time delay circuit 84, indicating that the actual water level has not been present at contact 41 (level B) for a predetermined period of time, AND gate 90 produces a logic high output which causes actuation of relay 91. This in turn causes actuation of fill valve 24 through the relay contacts and illumination of the FILL LED indicator 92. Consequently, the fill valve opens to admit water to the pool through conduit 25 and inlet 23 (FIG. 1).

When the water rises to the point where contact 41 (level B) has been submerged for a predetermined time period, the output of delay circuit 84 changes to a logic high, causing the output of AND gate 90 to become logic low and relay 91 to be de-energized. Consequently, fill valve 24 closes and the filling action ceases.

To preclude fill valve 24 from opening in the event of a high water level in the pool, as might be caused by a malfunction in the circuitry associated with sensor 41, the output of delay circuit 83 is applied to NOR gate 89. When the output of delay circuit 83 is logic high, indicating that water has existed at contact 40 (level A) for a predetermined time period, the output of NOR gate 89 is forced logic low, inhibiting AND gate 90 and precluding the opening of fill valve 24 during the high water level condition.

To remedy the high water condition the output of delay circuit 83 is also applied through an AND gate 93 to a dump valve actuator relay 94. In the presence of enabling inputs at the other inputs of AND gate 93, the output of delay circuit 83 causes actuation of relay 94 and dump valve 15. The dup valve continues to remain open until the water level falls below level A and contact 40 remains exposed for a predetermined time interval. At this time, the output of delay circuit 83 again changes state and dump valve 15 is closed.

To preclude operation of dump valve 15 in the vent of a low water condition, as sensed by electrodes 42 and 43 at level C, the output of delay circuit 85, representing the existence of a low water level condition for a predetermined time period, is, in accordance with another aspect of the invention, applied to another input of AND gate 93. In the absence of water at level C, the logic low output of delay circuit 85 inhibits AND gate 93 to preclude operation of dump valve 15.

To provide for user control of filter pump 20, the control system may include a filter control switch 100. One terminal of this switch is grounded, and the other terminal is connected to a source of positive unidirectional current by a resistor 101 and to one input of an OR gate 102. The output of OR gate 102 is connected through an AND gate 103 to a recirculation pump control relay 104. In the presence of enabling inputs on the remaining inputs of AND gate 103, actuation of control switch 100 results in an output from AND gate 103 which energizes relay 104 to apply line current to recirculation pump 20. At the same time, an LED indicator 105 is energized to indicate that the recirculation pump is operating.

To preclude operation of recirculation pump 20 in the event of a low water level condition, the output of delay circuit 85 is connected to one input of AND gate 103. In the event of a low water level condition, the logic low output of the delay circuit 85 inhibits AND gate 103 to preclude actuation of relay 104 and operation of the pump.

To provide for operation of recirculation pump 20 in the event of a low ambient temperature condition, such as might result in freezing or damage to pool components, the control system includes a temperature sensing circuit 110 and temperature sensing element 111. The sensing element, which is mounted so as to be exposed to ambient air, causes temperature sensing circuit 110 to produce an output signal in the presence of a potentially damaging temperature. This signal is applied to OR gate 102 wherein it causes the gate to produce an output which causes AND gate 103 to actuate relay 104, causing recirculation pump 20 to operate.

It is also desirable that circulation pump 20 operate in the event of a high water level condition to circulate water within the pool as water is drained from the pool by dump valve 15. To this end the output of delay circuit 83 is connected to the remaining input of OR 102, causing relay 104 to be actuated in the presence of a logic high output from delay circuit 83 signifying a high water level condition.

To preclude operation of the pool control system in the event that water level sensor unit 31 should be unplugged, or in the event that cable 33 should be damaged, the pool control circuit includes, in accordance with another aspect of the invention, a monitoring loop circuit through conductor 44, contact 43, and conductor 48. Contact 43 serves as a ground return contact for sensing electrodes 40-42, and to this end is grounded through conductor 48. Conductor 44 is connected through terminal strip 50 to the input of an inverter amplifier 112, and to a source of unidirectional current through a resistor 113. The output of inverter amplifier 112 is connected directly to one input of AND gate 90, to one input of AND gate 93, to one input of AND gate 103, and through an inverter amplifier 115 to an LED indicator lamp 116.

With the monitoring loop intact, the input to inverter amplifier 112 is held logic low and the output is held logic high. This output enables AND gate 103, allowing operation of recirculation pump 20, and enables AND gate 93, allowing operation of dump valve 15. At the same time, the output of inverter amplifier 112 is applied to AND gate 90 wherein it enables the operation of fill valve 24.

Operating power for control circuit 30 is provided by a conventional power supply circuit comprising a transformer 120 connected to the AC line through a power switch 121 and line fuse 122. Transformer 120 includes a center-tapped secondary winding which supplies AC current to dump valve 15 and fill valve 24 through respective control relays 91 and 94. An incandescent light 123 may be connected across the secondary winding to provide an indication that power is applied to the control circuit.

To provide operating power for the previously described circuitry of the control system the center tap of the transformer secondary winding is grounded and a pair of diodes 124 and 125 are connected to respective end terminals. The diodes in turn are connected to a conventional power supply filter network comprising a capacitor 126, a filter choke 127 and a capacitor 128, which serve to filter the pulsating direct current rectified by the diodes to develop a direct current suitable for supplying the system circuits. A voltage regulator stage may be provided in a conventional manner if required.

Figure 4:
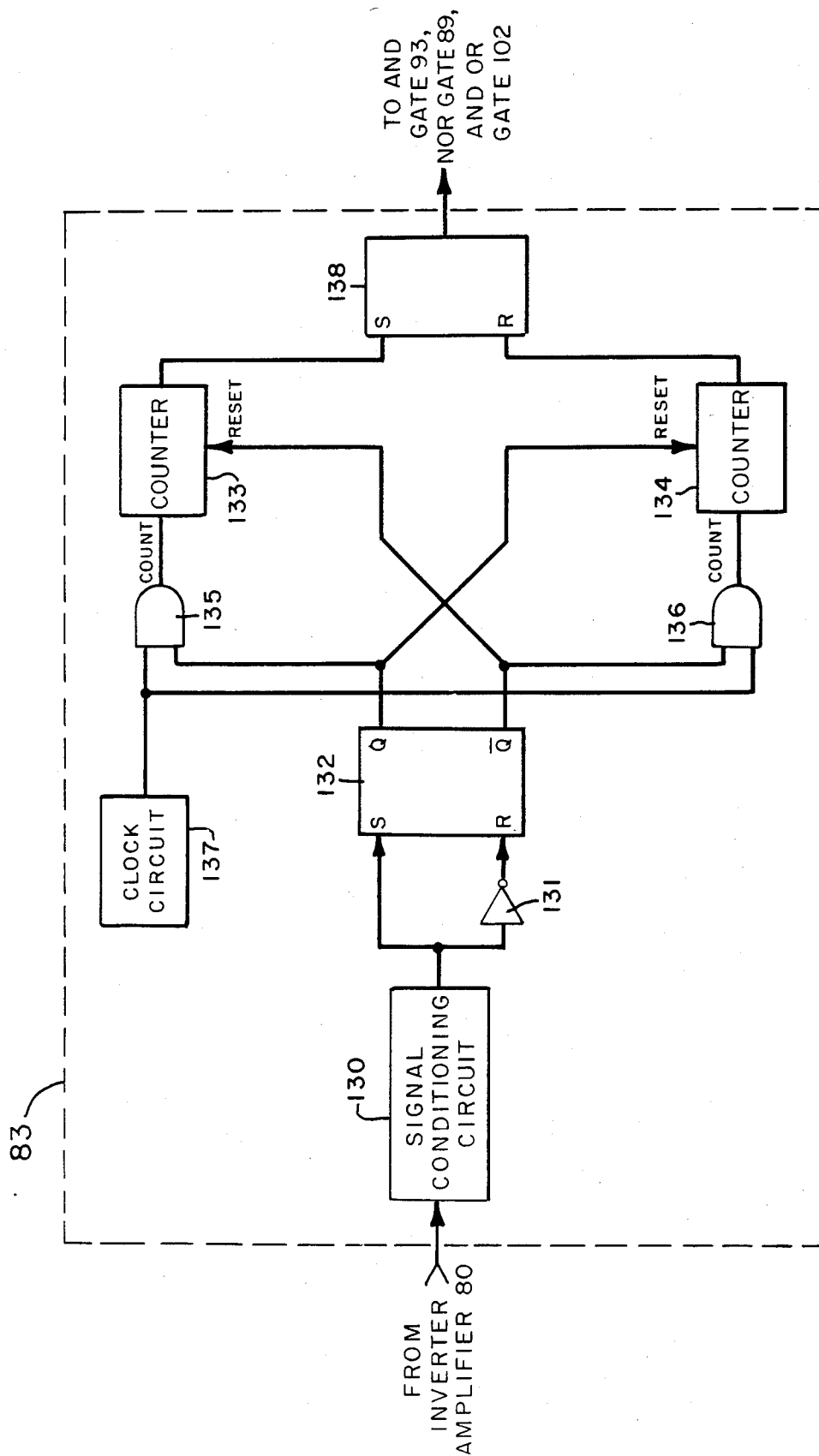
FIG. 4 is a simplified electrical schematic diagram of the delay circuit utilized in the control system.

Referring to FIG. 4, delay circuit 83 may be advantageously constructed utilizing conventional digital techniques and components. In particular, the output of inverter amplifier 80 may be applied to a conventional signal conditioning circuit 130, wherein, as described in U.S. Pat. No. 4,380,091, extraneous and transient signals brought about by short term disturbances in the pool are filtered out to produce a conditioned output signal having high and low logic states depending on the presence or absence of water at sensing terminal 40. This signal is applied directed to the set input, and through an inverter amplifier 131 to the reset input, of an RS flip-flop 132. Consequently, with each change in logic state the flip-flop changes between corresponding set and reset states.

To provide for timing the occurrence of each state of flip-flop 132, and hence for timing the presence or absence of water, delay circuit 83 includes a pair of counters 133 and 134, a pair of AND gates 135 and 136, and a clock circuit 137. Clock pulses are applied through AND gate 135 to counter 133, and through AND gate 136 to counter 134. The non-inverting and inverting outputs of flip-flop 132 are connected to inputs of AND gates 135 and 136, respectively.

When flip-flop 132 is in its set state, as when responding to the presence of water, AND gate 135 is enabled counter 133 is incremented by pulses, and counter 134 is reset to zero. When flip-flop 132 is in its reset state, as when responding to the absence of water, AND gate 136 is enabled, counter 134 is incremented, and counter 133 is reset to zero.

The outputs of counter 133 and 134 are connected to the set and reset inputs, respectively, of an RS flip-flop 138. When counter 133 reaches a predetermined maximum count it provides an output signal which causes flip-flop 138 to assume a set state. This causes a logic high output to be produced by delay circuit 83 which continues until such time as water is no longer present at level A, counter 134 reaches its maximum count, and flip-flop 138 is conditioned to a reset state.

By selecting the frequency of the pulses produced by clock circuit 137, and the maximum count required for counters 133 and 134 to produce an output, the delay periods for water presence and absence recognition may be individually set. In a home swimming pool systems uniform delay periods of two minutes have provided good results. Delay circuits 84 and 85 may be identical in construction and operation to delay circuit 83.

By reason of the use of predetermined time periods in connection with the sensing of water levels by sensing contacts 40-43, the swimming pool control system of the present invention avoids the use of multiple sensing contacts to define a single water level. As a result, precision control of pool water level in a pool system is obtained utilizing only three contact levels and a single common return contact. Furthermore, the system incorporates numerous protective features which preclude operation in the event of a complete or partial failure within the system.

It will be appreciated that while the system has been shown as constructed utilizing discrete circuits and components, it would be possible if desired to incorporate one or more of the system control functions within a conventional microprocessor chip. In particular, that portion of the illustrated system shown within the dotted enclosure 140, including delay circuits 83-85, could, if desired, be constructed using conventional microprocessor hardware and conventional microprocessor programming techniques.

Furthermore, it will be appreciated that various manual overrides and additional exterior switching can be provided to allow manual operation of a pool system separate and apart from that provided by the automatic control system. Such additional circuitry has not been shown herein to avoid unnecessary complication. Moreover, it will be appreciated that once installed within the pool the sensor unit 31 can be readily adjusted by the user so that the normal water level as defined by sensing contact 41 corresponds to the desired level L of water in the pool. If desired, various locking devices can be employed to lock the sensor unit in position on mounting bracket 35.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A system for maintaining water at a predetermined nominal level within a swimming pool wherein the surface of the water is subject to repeated disturbances, said system being adapted to control a fill valve to add water to the pool as required, comprising:

nominal water level sensing means positioned in the pool at the predetermined nominal level and including an electrical contact exposed to the disturbed surface of the water in the pool for producing an output signal indicative of the instantaneous presence or absence of water at the predetermined nominal level;

delay circuit means for producing a first control signal indicative after a first predetermined sensing period of the continuous uninterrupted presence of said output signal during said entire first sensing period, and a second control signal indicative after a second predetermined sensing period of the continuous uninterrupted absence of said output signal during said entire second sensing period;

said delay circuit means including first and second pulse-driven counters, a source of clock pulses for said counters and a bistable latch circuit, the output of said first counter being enabled only in the presence of said output signal and reset in the absence of said output signal and conditioning said latch circuit to one switching state upon reaching a predetermined count, said second counter being enabled only in the absence of said output signal and reset in the presence of said output signal and conditioning said latch circuit to its other switching state upon reaching a predetermined count, said latch circuit developing said control signals in accordance with the switching state thereof, and control circuit means for closing the fill valve in response to said first control signal, and for opening the fill valve in response to said second control signal to maintain the water in the swimming pool at the predetermined level.

2. A swimming pool control system as defined in claim 1 wherein said first and second predetermined sensing periods are equal.

3. A swimming pool control system as defined in claim 1 wherein the pool includes a recirculation pump requiring a predetermined minimum water level less than the predetermined nominal level, and the control system further includes minimum water level sensing means positioned in the pool at the predetermined minimum level, and including an additional contact exposed to the disturbed surface of the water in the pool, for producing an additional output signal indicative of the instantaneous presence of absence of water at the predetermined minimum level, and additional delay circuit means for producing after an additional predetermined sensing period an additional control signal indicative of the continuous uninterrupted absence of said additional output signal during said additional sensing period, and control circuit means for terminating the operation of the recirculation pump upon said additional control signal indicating the absence of water at said predetermined minimum level.

4. A system for controlling water level within a swimming pool, wherein the level of the water is maintained between a predetermined nominal high level and a predetermined nominal low level, and wherein the surface is subject to repeated disturbances, said system being adapted to control a fill valve to add water to the pool as requiried, and a dump valve to remove water from the pool as required, comprising:

nominal high water level sensing means including a first water sensing contact mounted on an exposed sidewall of the swimming pool at the predetermined nominal high level and including a first water sensing contact exposed to the disturbed surface of the water in the pool for producing a first output signal indicative of the instantaneous presence or absence of water at the predetermined nominal high level;

first delay circuit means for producing a first control signal indicative after a first predetermined sensing period of the continuous uninterrupted presence of said first output signal during said first predetermined sensing period, and a second control signal indicative after a second predetermed sensing period of the continuous uninterrupted absence of said first output signal during said second predetermined sensing period;

nominal low water level sensing means including a second water sensing contact mounted on an exposed sidewall of the positioned in the swimming pool at the predetermined nominal low level and including a second water sensing contact exposed to the disturbed surface of the water in the pool for providing a second output signal indicative of the instantaneous presence or absence of water at the predetermined nominal low level;

second delay circuit means for producing a third control signal indicative after a third predetermined sensing period of the continuous uninterrupted presence of said second output signal during said third predetermined sensing period, and a fourth control signal indicative after a fourth sensing period of the continuous uninterrupted absence of said second output signal during said fourth predetermined sensing period;

said delay circuit means including first and second pulse-driven counters, a source of clock pulses for said counters and a bistable latch circuit, the output of said first counter being enabled only on the presence of said output signal and reset in the absence of said output signal and conditioning said latch circuit to one switching state upon reaching a predetermined count, said second counter being enabled only in the absence of said output signal and reset in the presence of said output signal and conditioning said latch circuit to its other switching state upon reaching a predetermined count, said latch circuit developing said control signals in accordance with the switching state thereof, and first control circuit means for opening the dump valve in response to said first control signal, and for closing the dump valve in response to said second control signal; and second control circuit means for closing the fill valve in response to said third control signal and for opening the fill valve in response to said fourth control signal.

5. A swimming pool control system as defined in claim 4 wherein said third and fourth sensing periods are equal.

6. A swimming pool control system as defined in claim 5 wherein said first, second, third and fourth sensing periods are equal.

7. A swimming pool control system as defined in claim 4 wherein the pool includes a recirculation pump requiring a predetermined minimum water level less than the predetermined low nominal level, and the control system further comprises minimum water level sensing means positioned in the pool at said predetermined minimum level and including a third electrical contact exposed to the disturbed surface of the water in the pool, for producing an additional output signal indicative of the instantaneous presence or absence of water at said predetermined minimum level, and additional delay circuit means for producing after an additional predetermined sensing period an additional control signal indicative of the continuous uninterrupted absence of said additional output signal during said additional sensing period; and additional control circuit means for inhibiting operation of the fill valve, dump valve and recirculation pump upon said additional control signal indicating the absence of water at said predetermined minimum level.

* * * * *